Figure 1:
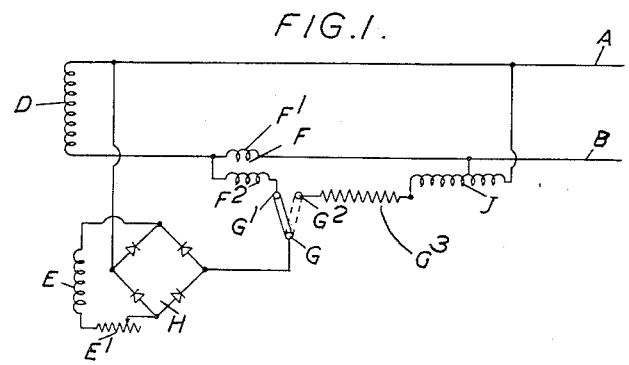

April 17, 1956     E. W. KREBS     2,742,602
EXCITATION CONTROL FOR SYNCHRONOUS DYNAMO ELECTRIC MACHINES
Original Filed May 10, 1951     4 Sheets-Sheet 1

Inventor
ERNST W. KREBS.
By *(signature)*
        his Attorney

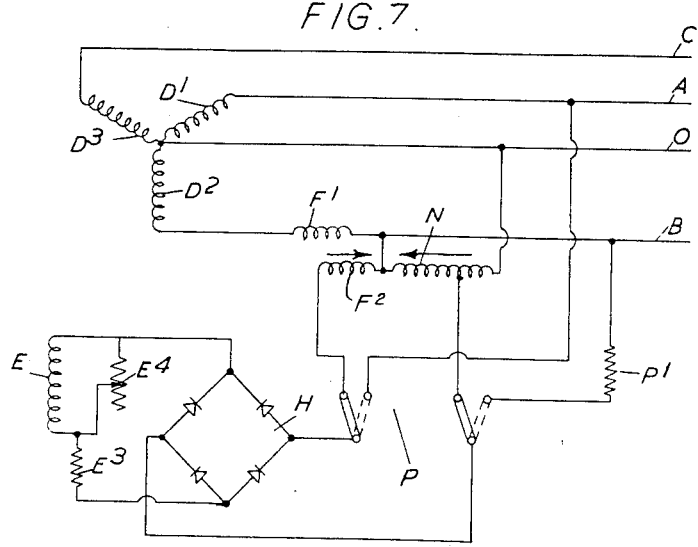
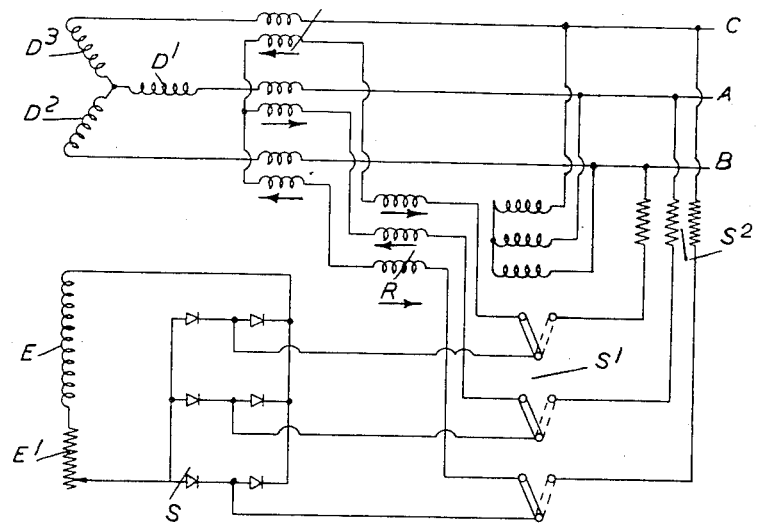

April 17, 1956　　　E. W. KREBS　　　2,742,602
EXCITATION CONTROL FOR SYNCHRONOUS DYNAMO ELECTRIC MACHINES
Original Filed May 10, 1951　　　4 Sheets-Sheet 4
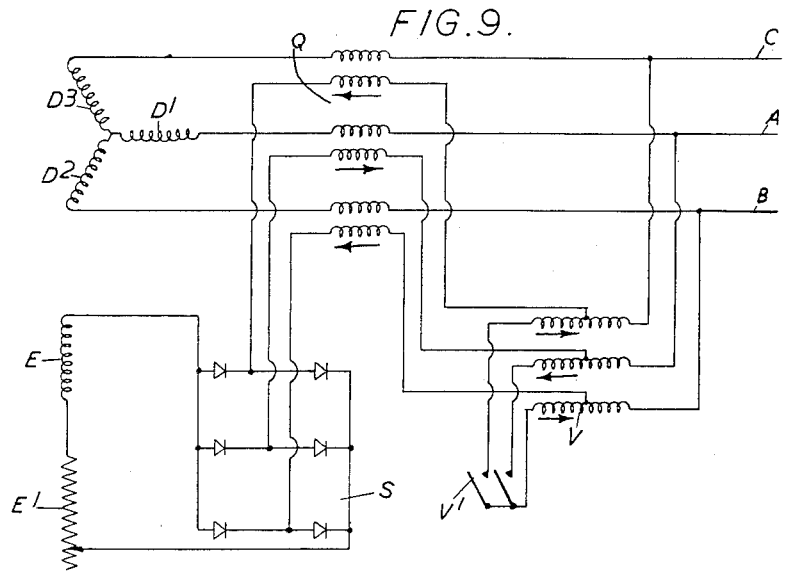
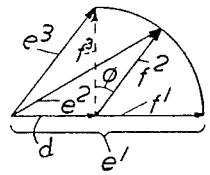
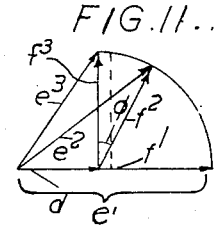
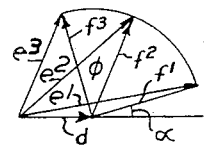
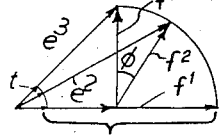
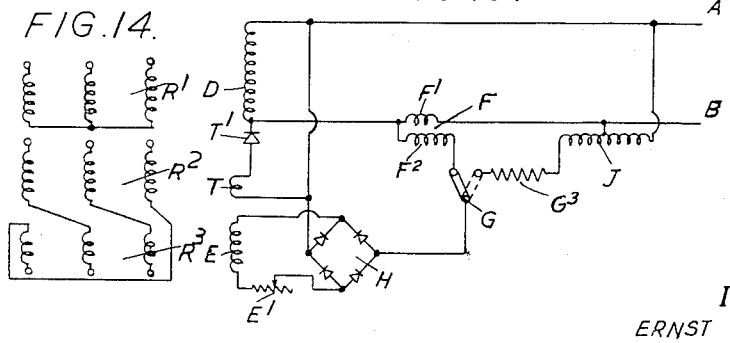
Inventor
ERNST W. KREBS.
By *[signature]*
　　Attorney

United States Patent Office 2,742,602
Patented Apr. 17, 1956

2,742,602

EXCITATION CONTROL FOR SYNCHRONOUS DYNAMO ELECTRIC MACHINES

Ernst Wolfgang Krebs, Purley, England

Original application May 10, 1951, Serial No. 225,481. Divided and this application December 17, 1952, Serial No. 326,435

10 Claims. (Cl. 322—24)

This application is a division of my copending patent application Serial No. 225,481, filed May 10, 1951, now abandoned.

This invention relates to synchronous dynamo-electric machines, and is concerned with compensating arrangements for controlling the terminal voltage of alternators with varying load.

When an alternator is running at substantially constant speed and generating power at unity or lagging power factor, the terminal voltage will fall with increasing load. If the terminal voltage is to be kept constant at constant or slightly falling speed under load, then the direct current excitation must be increased with either increasing load at a given power factor or with decreasing power factor at a given load, or if both conditions occur simultaneously.

In order to vary automatically and rapidly the direct current excitation of an alternator running at substantially constant speed so as to maintain the terminal voltage substantially constant over a wide range of load and power factor, it has previously been proposed to employ in combination with the alternator a rectifier and means for supplying to the rectifier the resultant of two alternating current components, one dependent on the terminal voltage and the other dependent on the load current, differing in phase by a substantial angle at unity power factor, the output from the rectifier being arranged to supply or control the excitation of the machine. Since a current transformer will introduce a phase shift at 180°, the desired phase relationship can be obtained by employing a current transformer in one phase and a voltage transformer connected across the same phase, with the terminals of the latter reversed as compared with a straight series connection.

When the alternator is started up, the voltage obtained from the residual magnetism and applied to the rectifier through the normal connections may be insufficient to overcome the internal resistance of the rectifier, so that the excitation may fail to build up. It is an object of the present invention to provide means for overcoming this difficulty.

According to the present invention, there is combined with an alternator a rectifier and a main exciting circuit, including means for supplying to the rectifier the resultant of two alternating current components, one dependent on the terminal voltage and the other dependent on the load current, whereof the latter leads the former by a substantial angle in the region of 90 electrical degrees at unity power factor but is approximately in phase with it at zero lagging power factor, and means for employing the rectified resultant to supply or control the excitation during normal running, and an initiating exciting circuit including means for deriving a small rectified current from the residual magnetism of the machine, and means for causing this rectified current to supply the initiating excitation when starting up, and switch contacts for rendering the initiating exciting circuit inoperative as the voltage of the machine builds up.

In one arrangement the initiating circuit is also connected to the input of the rectifier, and in this case the voltage applied to the rectifier by the initiating circuit when starting may be substantially greater than that which would be applied to the rectifier by the main exciting circuit at the same residual flux, for the purpose of overcoming the contact resistance of the rectifier when starting, to build up the excitation from the residual magnetism of the machine.

In an alternative arrangement, however, the apparatus may include initiating means for applying excitation to the field independently of the rectifier to build up the excitation of the machine from the residual magnetism when starting. Thus the necessity for increasing the ratio of applied rectifier voltage to rectifier impedance when starting may be avoided.

Figure 2:
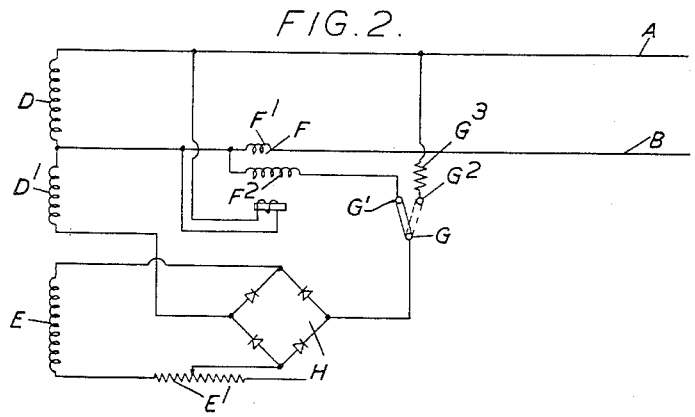
Figure 3:
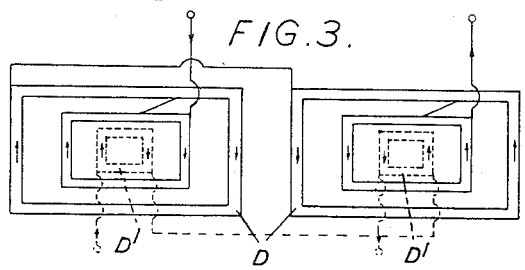
Figure 4:
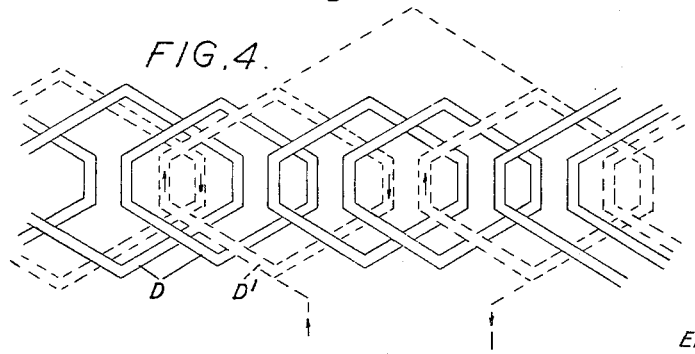
Figure 5:
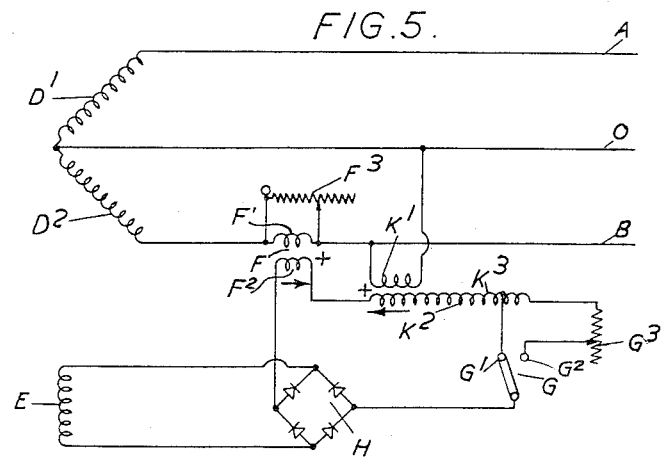
Figure 6:
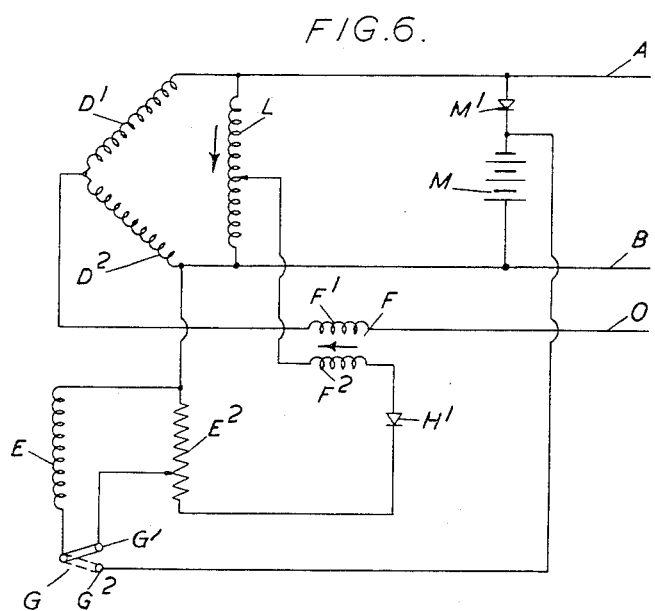

The invention may be carried into practice in various ways, but certain specific embodiments will be described by way of example with reference to the accompanying drawings, in which:

Figure 1 is a circuit diagram of a single-phase arrangement employing a voltage auto-transformer, Figure 2 is a circuit diagram of a single-phase arrangement employing an auxiliary winding on the armature, Figures 3 and 4 are respectively two diagrams of two possible arrangements of the auxiliary winding, Figure 5 is a circuit diagram of a two-phase arrangement for use with a balanced load, Figure 6 is a circuit diagram of a two-phase arrangement that can be used with an unbalanced load, showing a battery for initiating excitation, Figure 7 is a circuit diagram of a three-phase arrangement for use with a balanced load, Figure 8 is a circuit diagram of a three-phase arrangement that can be used with an unbalanced load, Figure 9 is a circuit diagram of a simplified form of three-phase arrangement using a voltage auto-transformer as a choke for initiation, Figures 10, 11, 12 and 13 are vector diagrams comparing the excitation obtained with a simple arrangement, that required due to saturation and salient poles, that obtained by phase shift, and that obtained by differential compounding, Figure 14 is a circuit diagram of a three-phase current transformer for obtaining phase shift, and Figure 15 is a diagram similar to Figure 1 showing an arrangement providing differential compounding.

In the arrangement shown in Figure 1 the invention is applied to a single-phase alternator having the usual single phase winding D on the rotating armature, and field windings E on the salient poles of a stationary magnet. The primary winding $F^1$ of a current transformer F is connected in series with the armature winding between it and one of the terminals A and B of the machine, whilst its secondary winding $F^2$, which may be provided with tappings, is connected, in series with the armature winding through a contact $G^1$ of a two-way switch G, to the alternating current input terminals of a rectifier H. This rectifier is preferably of the dry plate type, for example of a selenium rectifier and may be bridge connected for full wave rectification. The direct current output terminals of the rectifier are connected to the field winding E of the alternator in series with a field regulator $E^1$ for setting the required constant voltage.

The number of turns of the field winding is chosen so that at normal speed it will provide the required no-load excitation of the alternator, whilst the current transformer is designed so as to supply excitation equal to or slightly in excess of that required for the alternator under short-circuit conditions. The resultant excitation will then vary with the load and power factor of the alternator so as to produce a substantially constant terminal voltage, with the alternator speed either constant or falling slightly with increasing load.

When the machine is started up the voltage due to the residual magnetism may be insufficient to overcome the contact resistance of the rectifier H, and hence difficulty may be experienced in building up the excitation.

To overcome this the second terminal $G^2$ of the two-way switch G is connected through a limiting resistance $G^3$ to the secondary winding of an auto-transformer J having its primary winding shunted across the armature D of the machine. The auto-transformer is chosen to give a voltage step-up so that the voltage applied to the rectifier will be greater than that across the armature and will be sufficient to pass a current through the rectifier and hence initiate the build-up of the excitation. The switch G may be manually operated, for example it may take the form of a press-button to be momentarily held in its initiating position, or it may comprise a relay automatically operated so as to return to its normal position as soon as the voltage across the terminals builds up. The current limiting resistance will be chosen to keep the excitation in the region of its normal value when the voltage builds up.

In an alternative arrangement, not shown, instead of applying the armature voltage direct to the rectifier a step down voltage transformer or auto-transformer may be employed.

In a further alternative shown in Figure 2, the armature is provided with an additional winding $D^1$ coaxial with its main winding, conveniently accommodated in otherwise unused slots or parts of slots, the voltage of this winding being applied to the rectifier. In this case the auto-transformer J can be omitted, since a voltage higher than the normal value can be applied to the rectifier by connecting the contact $G^2$ of the switch G to the terminal A of the armature. In this way instead of applying the reduced voltage of the auxiliary winding to the rectifier this voltage, plus the full voltage of the main winding, is applied to it. The voltage of the auxiliary winding might perhaps be 15% or 25% of the terminal voltage.

Figures 3 and 4 show diagrammatically two possible arrangements of the auxiliary winding in otherwise unoccupied slots. The arrangement of Figure 3 shows a main winding D consisting of two concentric coils for each pole and an auxiliary winding $D^1$ occupying the central two slots which are not required for the main winding. Figure 4 shows a similar arrangement embodying a basket winding connected to give the same distribution in the slots as that of Figure 3.

In a further arrangement, shown in Figure 5, the invention is applied to a two-phase alternator of rotating field type, the voltage compensation being derived from one phase only. The armature winding has two phases $D^1$ and $D^2$ supplying the terminals A and B and a common neutral O. The primary winding $F^1$ of a current transformer F is connected in series with the phase $D^2$ between it and the terminal B and is shunted by a diverter resistance $F^3$. The primary winding $K^1$ of a voltage transformer K is connected in parallel with the same phase winding $D^2$ including the current transformer primary winding. The secondary windings $F^2$ and $K^2$ of the current transformer and the voltage transformer are connected in series through the contact $G^1$ of the switch G across the alternating current input terminals of the rectifier bridge H whereof the direct current output terminals are directly connected to the field winding E.

The secondary winding $K^2$ of the voltage transformer K is provided with an additional section $K^3$ which can be brought into circuit by moving the switch G to the initiating position $G^2$ so as to apply a higher voltage to the rectifier for initiating excitation. The directions in which the transformers are connected are so arranged that, bearing in mind the phase shift of 180° in the voltage transformer and 90° in the current transformer, the component of voltage applied by the current transformer to the rectifier will lead the component supplied by the voltage transformer by 90° at unity power factor, and hence the two components will be in phase at zero lagging power factor.

The arrangement shown in Figure 5 will only give compensation if the load is balanced between the two phases. If compensation is required for unbalanced load the arrangement may be duplicated by providing two current transformers, two voltage transformers and two rectifiers, one set for each phase, feeding either a single field winding or two separate field windings. Alternatively a two-phase current transformer and a two-phase voltage transformer may be provided feeding a two-phase rectifier.

In a further two-phase arrangement shown in Figure 6 compensation is controlled by the neutral current. For this purpose the primary winding $F^1$ of a current transformer is connected in series between the neutral point and the neutral terminal O.

The primary winding of a voltage transformer or step down auto-transformer L is connected across the phase terminals A and B whilst the secondary winding, for example part of the primary winding, is connected in series with the secondary winding of the current transformer and these two series connected windings are connected to the rectifier and field winding. This may, for example, be a single half-wave rectifier $H^1$ connected in series with a regulating potentiometer $E^2$ across the tapped portion of which the field winding is connected.

In this case the arrangement for initiating excitation may be generally as previously described, or alternatively, as shown in the drawing, it may include a battery M having one terminal connected to the terminal B and the other terminal connected through the contact $G^2$ of the switch to one end of the field winding E so that when the switch is in the initiating position the field winding E is connected directly across the battery. The latter terminal of the battery may also be connected through a rectifier $M^1$ to the terminal A so as to effect trickle charging of the battery. The battery may of course be employed for other purposes besides initiation of excitation.

In this arrangement the initiating circuit, which derives its power from the battery, supplies initiating excitation to the field windings independently of the rectifier $H^1$. In order to avoid the inconvenience of a battery, however, the arrangement could be modified so that the initiating circuit derives its power from the residual magnetism of the machine and supplies excitation to the field independently of the rectifier $H^1$, as indicated above. By such means a self-contained arrangement can be achieved.

In a further arrangement shown in Figure 7 for compensating balanced loads on a three-phase star connected alternator having phase windings $D^1$, $D^2$ and $D^3$ connected to terminals A, B and C and a star point connected to a terminal O the primary winding $F^1$ of a current transformer is connected in the lead from one phase winding $D^2$ to the corresponding terminal B. The primary winding of a step down voltage auto-transformer N is connected across the same phase winding $D^2$ whilst its secondary winding is connected in series with the secondary winding of the current transformer through a two-pole two-way switch P to the input terminals of a bridge connected rectifier H. The output terminals are connected through a series resistor $E^3$ to the field winding E shunted by a diverter $E^4$.

For initiating purposes the switch P can be moved to an initiating position in which it connects the input of the rectifier directly across the terminals A and B through the current limiting resistance $P^1$.

The arrangement shown in Figure 7 only gives compensation for a balanced load. A further three-phase arrangement shown in Figure 8 gives compensation for unbalanced as well as balanced loads and incorporates a three-phase current transformer Q, a three-phase voltage transformer R and a three-phase rectifier S.

The primary windings of the current transformer are connected respectively in the phase lines whilst the ends of the star connected secondary winding are each connected in series with the corresponding separate winding of the voltage transformer of which the primary winding is star connected. Of the other ends of the voltage transformer secondary windings each is connected through one pole of a three-pole two-way switch $S^1$ to the junction of a pair of rectifiers connected in series in the same direction between the output terminals of the rectifier. These terminals are connected to the field winding E in series with a field regulator $E^1$. For initiating, the rectifier input is connected direct to the lines A, B and C through the other contacts of the switch $S^1$ and through current limiting resistances $S^2$.

Thus whereas the transformer R might give a voltage of one-tenth to one-sixth of the terminal voltage, the initiating switch contacts $S^1$ will apply the full terminal voltage to the rectifier.

Figure 9 shows a simplified form of the three-phase arrangement described with reference to Figure 8, in which a three-phase auto-transformer V is substituted for the separately wound voltage transformer R of Figure 8. The initiating switch can then be simplified and may take the form of a two-pole one-way push button $V^1$ serving to connect together the ends of the three windings of the auto-transformer so as to give a star connection. Moreover the impedance of a portion of the transformer is employed to take the place of the three-phase limiting resistance $S^2$ so that the latter also is eliminated. In other respects the arrangement of Figure 15 is similar to that of Figure 8.

The arrangements described would provide substantially complete compensation for change of phase of the load current with respect to the load voltage if the poles were uniformly and continuously distributed round the machine and the flux were at all times proportional to the field current. In practice a slight error is introduced due to the effect of partial saturation of the field and the effect of salient poles. Figure 10 is a vector diagram indicating the effect obtained with the arrangements described, which shows a voltage vector $d$ and current vectors $f^1$ in phase with the voltage as at zero lagging power factor, $f^2$ inclined at an angle of 90—$\phi$ to the voltage as at power factor cos $\phi$, and $f^3$ at right angles to the voltage as at unity power factor. The corresponding vectors $e^1$, $e^2$ and $e^3$ represent the corresponding magnitudes of the field current although, these being rectified currents, the direction of the vector has no significance.

Figure 11 shows the corresponding diagram of the vectors that would be required to correct for the effect of saturation and salient poles. Here the ends of the vectors $f^1$, $f^2$ and $f^3$ lie on a circle whose centre is to the right of their starting point. As a result the magnitude $e^3$ of the field current at unity power factor is rather less than it is in Figure 10 for the same value of the magnitude $e^1$ at zero power factor.

One way of approximating to this condition is indicated in Figure 12, in which arrangements are made for shifting the phase of the current vector through an angle in relation to the voltage vector, the phase shift being the same at all power factors. Comparing Figure 12 with Figure 10, it will be seen that the magnitude $e^1$ of the field current at zero power factor is reduced hardly at all, whereas the magnitude $e^3$ at unity power factor is reduced appreciably. In short the effect of the phase shift of Figure 12 on the magnitude of the field current at any given power factor approximates to the desired variation indicated in Figure 11.

Figure 13 is a vector diagram of a further method of obtaining a similar result by differential compounding. Here an additional field winding is provided which opposes the main field winding and carries a current independent of the magnitude or phase of the load current. Accordingly, the diagram of Figure 13 is the same as that of Figure 10 except that the effective ampere turns of the field winding is reduced by a constant amount at all power factors. Accordingly the effective excitation current is shown by the amounts $e^1$, $e^2$ and $e^3$, the ends of which lie on a small circle, the radius $t$ of which represents the differential compounding. Since the magnitude $e^1$ in Figure 10 is greater than the magnitude $e^3$ the subtraction from each of an equal quantity $t$ will reduce the latter by a greater proportion than the former. The result therefore approximates to the desired result indicated in Figure 11.

Figure 14 shows the three-phase voltage transformer R of Figure 8 modified to give a phase shift as discussed in connection with Figure 12. Here the transformer has an ordinary star connected primary winding $R^1$ as shown in Figure 8 but each of the separate phase windings is in two sections $R^2$ and $R^3$, the section $R^2$ of one phase being connected in series with the section $R^3$ of the next phase. By suitably proportioning the number of turns of the two sections in relation to one another any desired value of phase shift can be effected. A suitable figure for the angle of phase shift would be between 6 and 12 electrical degrees, depending on circumstances. A similar arrangement may be applied to the current transformer instead of the voltage transformer, since it is immaterial whether the phase shift is imparted to one or the other provided their phase relationship is varied. Again the phase shift may be applied to the primary winding instead of the secondary winding.

Figure 15 shows a modification of Figure 1 incorporating differential compounding as discussed in connection with Figure 13. Here a differential field winding T is connected in series with a half wave rectifier $T^1$ across the armature winding. The polarity of the rectifier is chosen so that the direct current flowing in the differential field winding T will oppose the direct current flowing in the main field winding E, and since the current in the differential field winding depends only on the armature voltage it will not be affected by the magnitude of the load current.

It will be appreciated that the invention is not limited to the arrangements described by way of example and that these may be modified and combined in various ways. For example in appropriate cases the voltage component may be obtained by direct connection or by a voltage transformer, transformers may be replaced by auto-transformers and vice versa, and the excitation may be controlled by series resistance, a potentiometer, a diverter, or tappings on one or more transformer windings, or by a suitable combination of these. Again various forms or arrangements of rectifier may be employed, it may also be desirable in some cases to connect the primary winding of the voltage transformer at a point between the armature winding and the current transformer. Then if the terminal voltage is kept constant the armature voltage will vary with the voltage drop in the current transformer and will contribute a small portion of the component varying with load.

The examples described above refer to synchronous machines for which the excitation is supplied by a rectifier without the aid of a direct current rotating machine. In the case of large synchronous machines it may be preferable to supply the excitation from a separate direct-current exciter, in order to reduce the size of the rectifier and transformers and other controlling devices. This can be done in accordance with the invention by connecting the output terminals of the rectifier to the field winding of the exciter, and the armature terminals of the exciter to the field winding of the synchronous machine, the rectifier being fed in the same way as already described.

In each of the examples described the arrangement is such that the component corresponding to current leads the component corresponding to voltage by 90 electrical degrees at unity power factor, so that these two components are in phase when the load current lags 90° on the voltage and the power factor is zero lagging. Accordingly as the lag of the load increases the excitation also increases so as to tend to maintain the voltage constant. Such an arrangement is desirable for a voltage control over a wide range of power factors. Since in practice the power factor range is often limited, it may in such cases be of advantage to depart to a certain extent from the right angle, in particular if the load on an alternator sometimes has a leading power factor.

Where, in such cases or in order to allow for impedance drop, whether in the case of an alternator or a motor, it is desired to depart from a phase difference of exactly 90° between the rectifier input components, one or other of these components may be compounded from components derived from two different phases. Alternatively the desired phase relationship may be obtained by a suitable transformer arrangement, for example a delta star arrangement. A further possibility is to employ a reactive diverter for example a choke, in place of a resistive diverter.

With a load taking a leading current, especially if the excitation components are 90° out of phase at unity power factor, the field current is reduced by the current transformer and the reduction may be so great that the voltage of the alternator collapses owing to lack of saturation. To avoid this disadvantage and to increase stability, the alternator may be provided with one or more permanent magnets in its magnetic circuit, as is known for increasing the stability of generators.

In the case of a motor the arrangement will generally be designed to maintain the power factor in the region of unity or some other predetermined value, irrespective of variations of load, and in particular to ensure a satisfactory power factor in the region of unity under full load or over-load conditions, thereby improving the over-load capacity of a given machine.

In general if a synchronous motor is over-excited it tends to behave like a condenser, consuming a current leading the voltage, whilst increase of load or reduction of excitation tends to retard the load current vector so that the power factor approaches unity. Thus the maximum excitation is required at the maximum load, but the increase of excitation should not occur proportionally to load current, but as the vector sum of load current and a fixed quantity. This may be achieved in applying the present invention by arranging for the two component voltages applied to the rectifier to be out of phase by an angle of about 90 electrical degrees.

Since the motor is designed to operate at a constant power factor the change of relative phase of the load current and voltage need not in this case be considered and if the phase difference between the rectifier input components is exactly 90°, it is, broadly speaking, immaterial whether the current component lags or leads the voltage component since the magnitude of the resultant will be the same in each case.

In general it will be convenient to arrange the machine, as in the case of the alternator already described, so that at unity generator power factor the current component of rectifier input leads the voltage component, which means that at unity motor power factor, the current being reversed, the current component will lag the voltage component.

From the point of view of transient response, it may be preferable that the current component of rectifier input should lead the voltage component at unity motor power factor. Thus if the mechanical load on the motor suddenly drops the motor becomes overexcited and the current consumed tends momentarily to advance in phase. If therefore the current component leads the voltage component this change of phase will tend to reduce the excitation and will reinforce the effect of the reduced load current in reducing the excitation so that the power factor will be more rapidly restored to its normal value. The converse process will occur in the case of a sudden increase of load.

To prevent the secondary winding of the current transformer from offering excessive impedance and restricting the excitation at no load, it is in general preferable to arrange an air gap or a non-magnetic section in the magnetic circuit of the current transformer, for instance by fitting a sheet of insulating material between the core and yoke of the transformer. This air gap can be varied and so used for adjusting the output voltage and excitation. The length of the air gap may be made adjustable but in general it will be more convenient to alter its effective area by lateral movement of the yoke, for example for presetting in the factory or by the user.

The full compensation of the armature reaction makes it possible to reduce the air gap of the alternator or synchronous motor to smaller dimensions than would otherwise be needed, and this results in an increased output for a given frame size or in a reduction of cost for a given output.

What I claim by my invention and desire to secure by Letters Patent is:

1. An excitation and control system for maintaining a predetermined inter-relation of power factor, load, and terminal voltage of an A. C. dynamo-electric machine having armature winding means and D. C. field winding means, comprising, in combination, rectifier means connected to the field winding means to supply direct current thereto, said rectifier means having a minimum impressed voltage below which insufficient current for self-excitation of the machine will flow in the field winding means; excitation means energized from the armature winding means to supply an A. C. voltage to said rectifier means and including a first device developing an A. C. voltage proportional to the load current and a second device developing an A. C. voltage proportional to the terminal voltage; said devices being connected in series with each other and with the A. C. input of said rectifier means to supply thereto an A. C. voltage which is proportional to the resultant of the load current and the terminal voltage, and said two devices being series connected with relatively reversed polarities so that the voltage developed by said first device leads the voltage developed by said second device by substantially 90° at unity power factor, and the two developed voltages are substantially in phase at zero lagging power factor; and excitation initiation means connected to the armature winding means and operative, while the generator is being started, to apply to said field winding means a D. C. voltage substantially in excess of such minimum impressed voltage.

2. An excitation and control system for maintaining a predetermined inter-relation of power factor, load, and terminal voltage of an A. C. dynamo-electric machine having armature winding means and D. C. field winding means, comprising, in combination, rectifier means connected to the field windings means to supply direct current thereto, said rectifier means having a minimum impressed voltage below which insufficient current for self-excitation of the machine will flow in the field winding means; excitation means energized from the armature winding means to supply an A. C. voltage to said rectifier means and including a first device developing an A. C. voltage proportional to the load current and a second device developing an A. C. voltage proportional to the terminal voltage; said devices being connected in series with each other and with the A. C. input of said rectifier means to supply thereto an A. C. voltage which is proportional to the resultant of the load current and the terminal voltage, and said two devices being series connected with relatively reversed polarities so that the voltage developed by said first device leads the voltage developed by said second device by substantially 90° at unity power factor, and the two developed voltages are substantially in phase at zero lagging power factor;

excitation initiation means connected to the armature winding means and operative, while the generator is being started, to apply to said field winding means a D. C. voltage substantially in excess of such minimum impressed voltage; and switch means operable to disconnect said excitation initiation means when the terminal voltage reaches substantially its normal value.

3. A system as claimed in claim 2 in which said excitation means includes a battery and a rectifier connected in series across the armature winding means, and said switch means is selectively operable to connect said battery in series with the field winding means.

4. An excitation and control system for maintaining a predetermined inter-relation of power factor, load, and terminal voltage of an A. C. dynamo-electric machine having armature winding means and D. C. field winding means, comprising, in combination, rectifier means connected to the field winding means to supply direct current thereto, said rectifier means having a minimum impressed voltage below which insufficient current for self-excitation of the machine will flow in the field winding means; excitation means energized from the armature winding means to supply an A. C. voltage to said rectifier means and including a first device developing an A. C. voltage proportional to the load current and a second device developing an A. C. voltage proportional to the terminal voltage; said devices being connected in series with each other and with the A. C. input of said rectifier means to supply thereto an A. C. voltage which is proportional to the resultant of the load current and the terminal voltage, and said two devices being series connected with relatively reversed polarities so that the voltage developed by said first device leads the voltage developed by said second device by substantially 90° at unity power factor, and the two developed voltages are substantially in phase at zero lagging power factor; and excitation initiation means connected to the armature winding means and operative, while the generator is being started, to apply to said rectifier means an A. C. voltage substantially in excess of such minimum impressed voltage.

5. An excitation and control system for maintaining a predetermined inter-relation of power factor, load, and terminal voltage of an A. C. dynamo-electric machine having armature winding means and D. C. field winding means, comprising, in combination, rectifier means connected to the field winding means to supply direct current thereto, said rectifier means having a minimum impressed voltage below which insufficient current for self-excitation of the machine will flow in the field winding means; excitation means energized from the armature winding means to supply an A. C. voltage to said rectifier means and including a first device developing an A. C. voltage proportional to the load current and a second device developing an A. C. voltage proportional to the terminal voltage; said devices being connected in series with each other and with the A. C. input of said rectifier means to supply thereto an A. C. voltage which is proportional to the resultant of the load current and the terminal voltage, and said two devices being series connected with relatively reversed polarities so that the voltage developed by said first device leads the voltage developed by said second device by substantially 90° at unity power factor, and the two developed voltages are substantially in phase at zero lagging power factor; excitation initiation means connected to the armature winding means and operative, while the generator is being started, to apply to said rectifier means an A. C. voltage substantially in excess of such minimum impressed voltage; and switch means operable to disconnect said excitation initiation means when the terminal voltage reaches substantially its normal value.

6. A system as claimed in claim 4 in which said first device comprises a current transformer having a primary winding connected in series with the armature winding means and a secondary winding connected to said rectifier means, and in which said second device comprises a voltage transformer having a primary winding connected across the armature winding means and a secondary winding connected to said rectifier means in series with the secondary winding of said current transformer.

7. A system as claimed in claim 6 in which said excitation initiation means includes an additional series connected section of said voltage transformer secondary winding.

8. A system as claimed in claim 6 in which said excitation initiation means includes means connecting said rectifier means across the armature winding means independently of said current and voltage transformers.

9. A system as claimed in claim 5 in which said excitation initiation means includes an autotransformer connected across the armature winding means and to said rectifier means.

10. A system as claimed in claim 5 in which said excitation initiation means includes an armature winding connected to the armature winding means in series with said rectifier means.

References Cited in the file of this patent

UNITED STATES PATENTS 2,208,416      Friedlander et al.      July 16, 1940